(12) United States Patent
Egashira et al.

(10) Patent No.: US 8,158,708 B2
(45) Date of Patent: Apr. 17, 2012

(54) GOLF BALL MATERIAL, GOLF BALL AND METHOD FOR PREPARING GOLF BALL MATERIAL

(75) Inventors: Yoshinori Egashira, Chichibu (JP); Jun Shindo, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 308 days.

(21) Appl. No.: 12/110,664

(22) Filed: Apr. 28, 2008

(65) Prior Publication Data

US 2009/0270544 A1 Oct. 29, 2009

(51) Int. Cl.
*A63B 37/00* (2006.01)
*A63B 37/12* (2006.01)
*C08L 33/02* (2006.01)

(52) U.S. Cl. ........ 524/506; 525/101; 525/106; 473/373; 473/378; 473/385

(58) Field of Classification Search ........................ None
See application file for complete search history.

(56) References Cited

U.S. PATENT DOCUMENTS

| | | | | |
|---|---|---|---|---|
| 5,173,290 A | * | 12/1992 | Halloran et al. | 424/70.121 |
| 6,585,607 B2 | | 7/2003 | Tzivanis et al. | |
| 6,716,919 B2 | * | 4/2004 | Lichtenhan et al. | 525/101 |
| 7,208,546 B2 | | 4/2007 | Rajagopalan et al. | |
| 2001/0011046 A1 | * | 8/2001 | Ichikawa et al. | 473/371 |
| 2005/0159524 A1 | * | 7/2005 | Rajagopalan et al. | 524/432 |
| 2006/0030668 A1 | * | 2/2006 | Egashira et al. | 525/221 |

FOREIGN PATENT DOCUMENTS

| | | |
|---|---|---|
| JP | 2002-511283 A | 4/2002 |
| JP | 2002-514109 A | 5/2002 |
| JP | 2005-074100 A | 3/2005 |
| WO | 98/43710 | 10/1998 |
| WO | 99/48568 | 9/1999 |

OTHER PUBLICATIONS

Kirk-Othmer; Concise Encyclopedia of Chemical Technology; 1990; p. 668.*
Guizhi Li et al., "Rheological Properties of poly(methyl ... Blends", Journal of Applied Polymer Science, vol. 104 (2007), pp. 352-359.
Bai-Yu Li et al., "Siloxane Surfactant-Modified Clay . . . Polymethylsilsesquioxane", Journal of Applied Polymer Science, vol. 100 (2006), pp. 3974-3980.

* cited by examiner

*Primary Examiner* — David Buttner
(74) *Attorney, Agent, or Firm* — Sughrue Mion, PLLC

(57) ABSTRACT

The invention provides a method for preparing a material which includes an ionomer blend composition containing a polysilsesquioxane, has a good inorganic filler dispersibility and a good moldability (mold releasability), and has an excellent scuff resistance and coefficient of restitution. The invention also provides a golf ball made using such a material. The ionomer blend composition is an ionomer-based material wherein the polysilsesquioxane and the ionomer are at least partly chemically bonded therebetween, and which has excellent properties such as coefficient of restitution and scuff resistance.

15 Claims, 2 Drawing Sheets

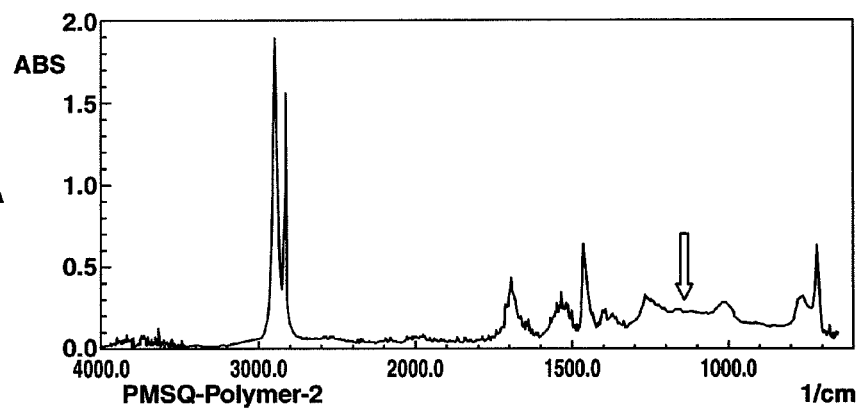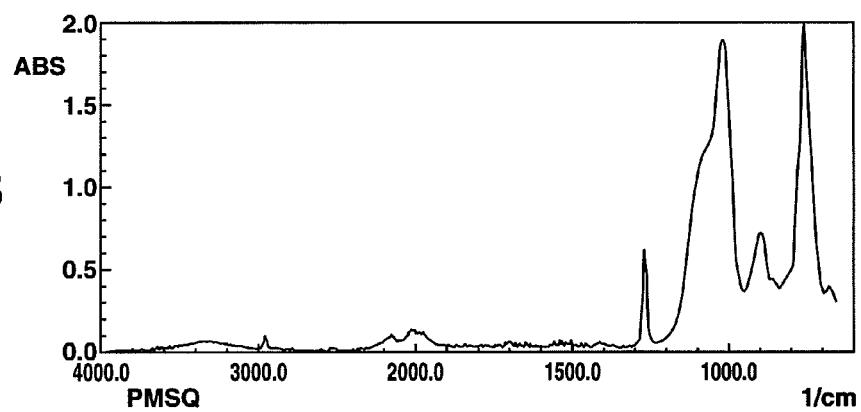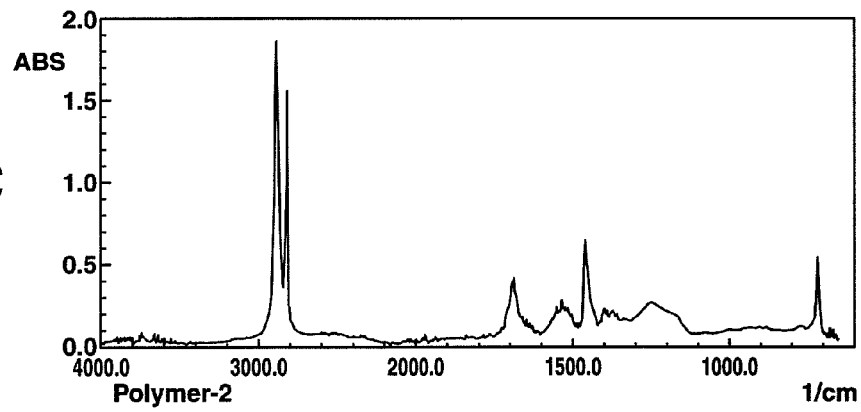

GOLF BALL MATERIAL, GOLF BALL AND METHOD FOR PREPARING GOLF BALL MATERIAL

BACKGROUND OF THE INVENTION

The present invention relates to a golf ball material which includes an ionomer blend composition containing a polysilsesquioxane. The invention also relates to a golf ball in which such a golf ball material is used, and to a method for preparing such a golf ball material.

Ionomeric resins (ionomers) are useful materials in golf balls, among other things. Ionomers obtained by using metal cations to neutralize copolymers of an α-olefin such as ethylene with an unsaturated carboxylic acid such as acrylic acid (AA), methacrylic acid (MAA) or maleic acid, and terpolymers of such an α-olefin and unsaturated carboxylic acid with an ester (softening monomer) of any of these unsaturated carboxylic acids, are especially useful as golf ball materials.

Golf balls manufactured using ionomer-based materials generally include various fillers for different purposes. Fillers such as titanium oxide, barium sulfate and calcium carbonate are used for such purposes as to increase coloration (whitening), specific gravity control or hardness enhancement. Various silicone materials are used for such purposes as to improve heat resistance, optical properties or dimensional stability of golf balls. With regard to silicone materials, the use of polyorganosiloxanes having a dialkylsiloxane skeleton is disclosed in, for example, JP-A 2005-74100 (Patent Document 1), JP-A 2002-511283 (Patent Document 2) and JP-A 2002-514109 (Patent Document 3).

In recent years, use has come to be made of polysilsesquioxane-type organic silicone materials having, unlike the foregoing polyorganosiloxane-type polymer structure, a steric structure prepared from a polyfunctional organosilane such as an organotrichlorosilane or an organotrialkoxysilane as the starting material. U.S. Pat. No. 7,208,546 (Patent Document 4) and U.S. Pat. No. 6,585,607 (Patent Document 5) mention golf ball materials which use Polyhedral Oligomeric Silsesquioxane (POSS) commercially sold by Hybrid Plastics (U.S.).

Research has recently been reported on polyphenylsilsesquioxane (PPSQ) and polymethylsilsesquioxane (PMSQ), which are novel materials having higher molecular weights than the above POSS moiety. For example, reference may be made to "Rheological properties of poly(methyl methacrylate)(PMMA)/rigid ladderlike polyphenylsilsesquioxane (PPSQ)" in *Journal of Applied Polymer Science*, 104 (1), 352-359 (2007) (Non-Patent Document 1), and to "Siloxane surfactant-modified clay and its effect in reinforcing the laminate of polymethylsilsesquioxane" in *Journal of Applied Polymer Science*, 100 (5), 3974-3980 (2006) (Non-Patent Document).

The above polysilsesquioxane materials having at least a three-dimensional structure are basically organic-inorganic hybrid materials. It is thus expected that, depending on how they are used, such polysilsesquioxane materials will function as an inorganic filler in ionomer-based golf ball materials and will at the same time provide the resin modifying role of an organic silicone. However, the use of polysilsesquioxane materials to impart both roles of a filler and a resin modifier in the above-mentioned ionomeric golf ball materials has not been reported yet in the past literatures and patents.

| Patent Document 1: | JP-A 2005-074100 |
|---|---|
| Patent Document 2: | JP-A 2002-511283 |
| Patent Document 3: | JP-A 2002-514109 |
| Patent Document 4: | U.S. Pat. No. 7,208,546 |
| Patent Document 5: | U.S. Pat. No. 6,585,607 |
| Non-Patent Document 1: | Journal off Applied Polymer Science, 104 (1), 352-359 (2007) |
| Non-Patent Document 2: | Journal off Applied Polymer Science, 100 (5), 3974-3980 (2006) |

SUMMARY OF THE INVENTION

It is therefore an object of the invention to provide an ionomer-based golf ball material in which a polysilsesquioxane material is used both as an inorganic filler and additionally as a resin modifier having functions to improve inorganic filler dispersibility, scuff resistance, mold releasability and coefficient of restitution. Another object of the invention is to provide a golf ball which includes as an essential component a part made from such a golf ball material. A further object of the invention is to provide a method for preparing such a golf ball material.

The inventors have conducted experiments in which they combined different polysilsesquioxane materials with ionomeric materials with the aim to impart both the functions of an inorganic filler and the above-mentioned resin-modifying functions to a polysilsesquioxane material to be blended with an ionomer resin. As a result, they have found out combinations of an ionomer material with a polysilsesquioxane material which has functional groups capable of reacting with un-neutralized carboxylic acid groups in the ionomer, moreover finding that such combinations have a good inorganic filler dispersibility and a good moldability (mold releasability), making the combinations ideal materials for forming high-performance golf balls endowed with excellent scuff resistance, coefficient of restitution and other properties.

On conducting further experiments, the inventors have additionally found that golf balls which include, as an essential golf ball component, a part made from the above-described golf ball material (e.g., the cover material in a solid two-piece golf ball composed of a core and a cover encasing the core, or the cover material or intermediate layer material in a solid multi-piece golf ball composed of a core of one or more layers, an intermediate layer of one or more layers encasing the core, and a cover of one or more layers encasing the intermediate layer; the same applies below) have an improved coefficient of restitution and an excellent scuff resistance.

Accordingly, the invention provides the following golf ball materials, golf balls, and methods for preparing golf ball materials.

[1] A golf ball material comprising an ionomer blend composition of:

(a) an ionomer having a base resin which is an E/X copolymer and/or an E/X/Y terpolymer, wherein E is an α-olefin, X is a $C_3$ to $C_8$ unsaturated monocarboxylic acid, unsaturated dicarboxylic acid or acid anhydride thereof and Y is an alkyl ester of an unsaturated monocarboxylic acid or unsaturated dicarboxylic acid in which the alkyl groups have from 1 to 8 carbon atoms; and (b) one or more polysilsesquioxanes which has at least an alkoxy group as one terminal functional group, having one of the following chemical structures (i), (ii) and (iii) below.

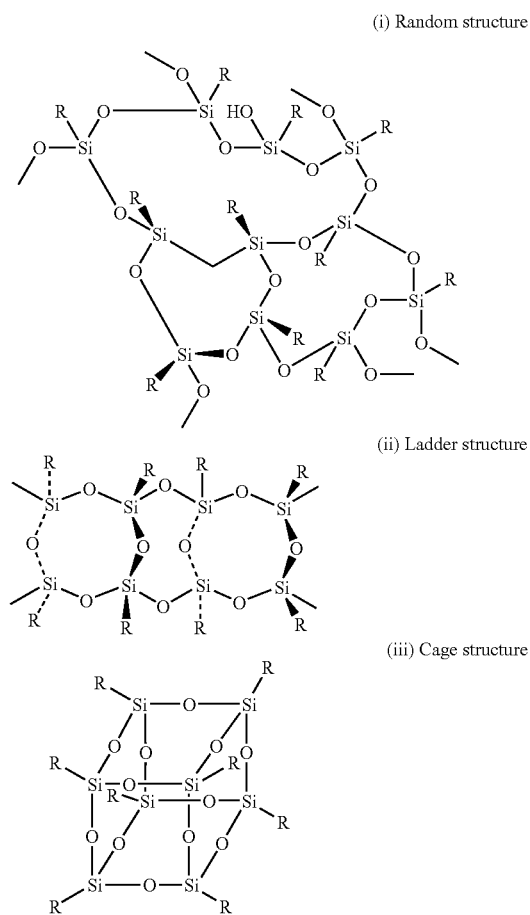

[2] A golf ball comprising the foregoing golf ball material, wherein the golf ball material is used as a cover material in a solid two-piece golf ball comprising a core and a cover encasing the core or as a cover material or an intermediate layer material in a solid multi-piece golf ball comprising a core of at least one layer, at least one intermediate layer encasing the core, and a cover of at least one layer encasing the intermediate layer.

[3] A method for preparing the above golf ball material, comprising the step of melt blending components (a) and (b) using a twin-screw extruder having an L/D ratio for the overall screw of at least 25 and a kneading disc zone L/D ratio which is in a range of from 20 to 80% of the overall L/D ratio so as to obtain an ionomer blend composition.

[4] A method for preparing the above golf ball material, comprising the steps of melt blending (a) the ionomer having a base resin which is at least one E/X copolymer and/or E/X/Y terpolymer with (b) the polysilsesquioxane; then carrying out a neutralization reaction with an oxygen-containing metal compound which is a metal cation source so as to obtain an ionomer blend composition of (a) and (b).

BRIEF DESCRIPTION OF THE DIAGRAMS

FIGS. 1A-1C show Fourier transform infrared spectra for the polysilsesquioxane and the ionomer used in Working Example 1.

DETAILED DESCRIPTION OF THE INVENTION

Figure 2:
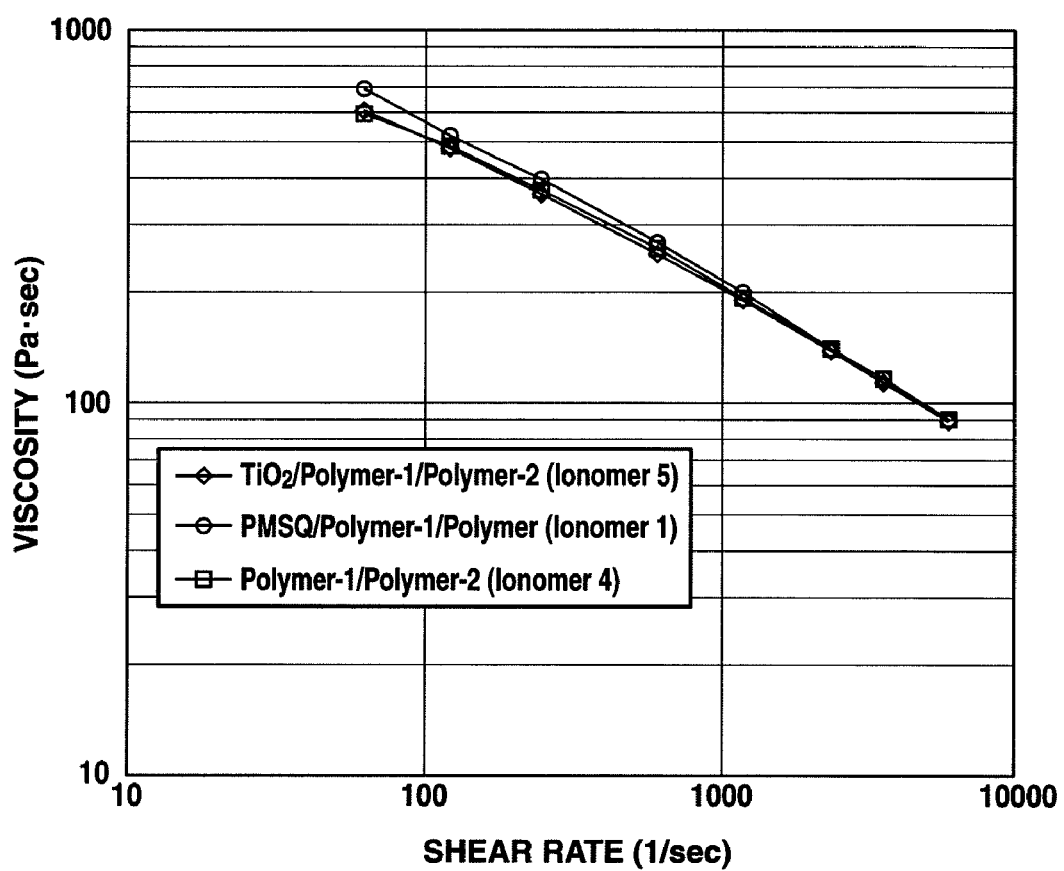
FIG. 2 shows a plot of viscosity versus shear rate for the ionomers used in Working Example 1 and Comparative Examples 1 and 2.

The invention is described more fully below.

The golf ball material of the invention includes an ionomer blend composition containing the two following components (a) and (b).

Component (a)

An ionomer having a base resin which is an E/X copolymer and/or an E/X/Y terpolymer, wherein E is an α-olefin, X is a $C_3$ to $C_8$ unsaturated monocarboxylic acid, unsaturated dicarboxylic acid or acid anhydride thereof and Y is an alkyl ester of an unsaturated monocarboxylic acid or unsaturated dicarboxylic acid in which the alkyl groups have from 1 to 8 carbon atoms.

X is present in an amount of preferably from about 1 to about 30 wt % based on the total weight of the copolymer or the terpolymer. Y is present in an amount of preferably from about 2 to about 30 wt % based on the total weight of the terpolymer.

Component (b)

One or more polysilsesquioxanes which has at least an alkoxy group as one terminal functional group, having one of chemical structures (i), (ii) and (iii) below.

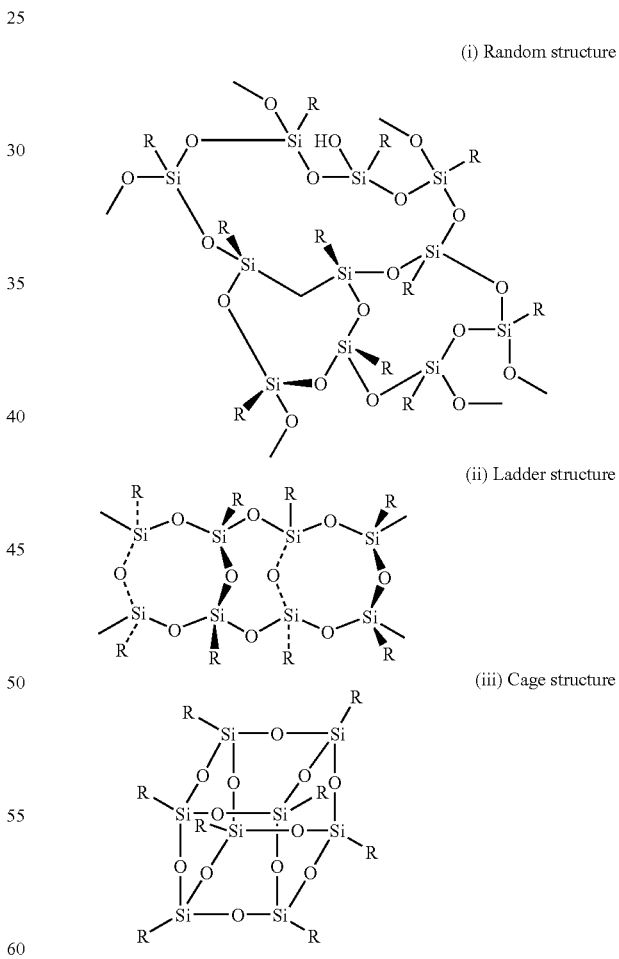

In the above chemical structures (i), (ii) and (iii) of the polysilsesquioxane, R represents functional groups which have preferably from 1 to 10 carbons. Such functional groups can be selected from the group consisting of alkyl, alkenyl, cycloalkyl, allyl, aralkyl, aryl, hydroxyl and alkoxy radicals. At least one terminal functional group represented by R is an alkoxy radical selected from the group consisting of methoxy, ethoxy, n-propoxy, isopropoxy, n-butoxy, isobutoxy, sec-butoxy, tert-butoxy, cyclohexyloxy and benzyloxy radicals. Selecting a methoxy radical or an ethoxy radical is especially preferred.

Under heating, carboxylic acids in the ionomer of above ionomer component (a) react with alkoxy radicals on the polysilsesquioxane, giving rise to ester condensation. In other words, carboxylic acid ester formation occurs due to the reaction of protons on the carboxylic acids with alkoxy radicals on the polysilsesquioxane.

The above polysilsesquioxane has a weight-average molecular weight of preferably at least about 500, more preferably at least about 1500, and even more preferably at least about 2000, but not more than about 20,000, preferably not more than about 15,000, and even more preferably not more than about 12,000.

Component (b) is included in a proportion, based on the combined weight of components (a) and (b), of preferably at least about 0.1 wt %, more preferably at least about 0.5 wt %, and even more preferably at least about 1 wt %, but preferably not more than about 30 wt %, more preferably not more than about 20 wt %, and even more preferably not more than about 10 wt %.

The ionomer of component (a) has a degree of neutralization, based on the acid content of the ionomer, of preferably from about 5 to about 95 mol %, more preferably from about 10 to about 90 mol %, and even more preferably from about 20 to about 80 mol %. The source of the metal cations in the ionomer component (a), while not subject to any particular limitation, is typically an oxygen-containing inorganic metal compound selected from the group consisting of metal oxides, metal carbonates and metal hydroxides. It is preferable for at least some portion of the acid groups in the ionomer base resin to be neutralized by such an oxygen-containing inorganic metal compound so as to obtain the ionomer component. At this time, it is preferable for the oxygen-containing inorganic metal compound used for the neutralization reaction to be in the form of fine particles (average particle size, from about 0.001 to about 5.0 μm) or a masterbatch (average particle size, from about 0.001 to about 100 μm; concentration, from about 20 wt % to about 80 wt %).

It is desirable that the metal cation source in the ionomer of component (a) be selected from among groups IA, IB, IIA, IIB, IIIA, IIIB, IVA, IVB, VA, VB, VIA, VIB, VIIB and VIIIB of the periodic table. Moreover, the metal cation source in the ionomer of component (a) is preferably selected from among oxygen-containing inorganic metal compounds. Preferred examples include, but are not limited to, lithium carbonate, sodium carbonate, potassium carbonate, magnesium carbonate, zinc carbonate (including basic zinc carbonate), calcium carbonate, magnesium oxide, zinc oxide, calcium oxide, calcium hydroxide and magnesium hydroxide. The foregoing compounds may be used singly or as combinations of two or more thereof.

The copolymer and/or terpolymer of component (a) are, as indicated above, respectively represented as E/X and E/X/Y. E is an olefin, suitable examples of which include ethylene, propylene, butene, pentene, hexene, heptene and octene. The use of ethylene is especially preferred.

Illustrative examples of unsaturated monocarboxylic acids that can be used as X include acrylic acid, methacrylic acid, maleic acid (anhydride) and fumaric acid. The use of acrylic acid and methacrylic acid is especially preferred. Illustrative examples of unsaturated dicarboxylic acids that can be used as X include maleic acid, fumaric acid and itaconic acid. Illustrative examples of unsaturated carboxylic anhydrides that can be used as X include maleic anhydride and itaconic anhydride. The use of maleic acid or maleic anhydride is especially preferred.

Unsaturated carboxylic acid esters which are suitable for use as Y include lower alkyl esters of the above unsaturated carboxylic acids. Specific examples include methyl methacrylate, ethyl methacrylate, propyl methacrylate, butyl methacrylate, methyl acrylate, ethyl acrylate, propyl acrylate and butyl acrylate. The use of butyl acrylate (n-butyl acrylate, isobutyl acrylate) is especially preferred. Unsaturated dicarboxylic acid half esters that can be used as Y include monoesters of the above-mentioned dicarboxylic acids, such as the monoethyl ester of maleic acid, the monomethyl ester of fumaric acid and the monoethyl ester of itaconic acid. The use of the monoethyl ester of maleic acid is especially preferred.

Examples of the above-described component (a) include, but are not limited to, the following polymers (1) to (7):

(1) olefin polymers to which has been grafted an unsaturated carboxylic anhydride, an unsaturated dicarboxylic acid and/or an unsaturated monocarboxylic acid;
(2) olefin-unsaturated carboxylic acid polymers to which has been grafted an unsaturated carboxylic anhydride, an unsaturated dicarboxylic acid and/or an unsaturated monocarboxylic acid;
(3) olefin-unsaturated carboxylic acid ester polymers to which has been grafted an unsaturated carboxylic anhydride, an unsaturated dicarboxylic acid and/or an unsaturated monocarboxylic acid;
(4) olefin-unsaturated carboxylic acid-unsaturated carboxylic acid ester polymers to which has been grafted an unsaturated carboxylic anhydride, an unsaturated dicarboxylic acid and/or an unsaturated monocarboxylic acid;
(5) olefin-unsaturated carboxylic anhydride-unsaturated monocarboxylic acid ester polymers;
(6) olefin-unsaturated dicarboxylic acid-unsaturated carboxylic acid ester polymers; and
(7) olefin-unsaturated dicarboxylic acid half ester-unsaturated monocarboxylic acid ester polymers.

Each of the above materials may be obtained using known methods for copolymerization and grafting. If the acid content within the copolymer is too low, the coefficient of restitution and the strength (ultimate tensile strength) may decrease. If the acid content is too high, the processability may decrease.

Examples of commercial products that may be used as the base polymer in the ionomer component (a) include olefin-unsaturated carboxylic acid polymers such as Nucrel 960 and Nucrel 2806 (both available from DuPont), and ESCOR 5110 and EXCOR 5200 (both available from Exxon-Mobil Chemical). Examples of olefin-unsaturated carboxylic acid-unsaturated carboxylic acid ester polymers include Nucrel AN4319, Nucrel 9-1 and Bynel 2022 (all available from DuPont), and ESCOR ATX325 and ESCOR ATX320 (both available from Exxon-Mobil Chemical). Examples of unsaturated carboxylic anhydride polymers include MODIPER A8100 and MODIPER A8200 (both available from NOF Corporation), and LOTADER 3200, LOTADER 5500 and LOTADER TX8030 (all available from Arkema).

Thermoplastic resins which can be included as a thermoplastic resin component in the ionomer blend composition obtained in the present invention include, but are not limited to, the following: polyolefin elastomers (including ethylene ionomers, polyolefins, metallocene polyolefins), polystyrene elastomers, diene polymers, polyacrylate polymers, polyamide elastomers, polyurethane elastomers, polyester elastomers and polyacetals.

In the present invention, instead of preparing the ionomer blend composition by melt blending the ionomer component (a) and the polysilsesquioxane component (b), it is also possible in fact to obtain the above ionomer blend composition by melt blending at least one E/X copolymer and/or E/X/Y terpolymer as the base resin of the ionomer component with (b) the above-described polysilsesquioxane, then carrying out a neutralization reaction with the above-mentioned oxygen-containing metal compound which is the metal cation source used when preparing the ionomer component (a). The ionomer blend composition obtained by this method of preparation has an interpenetrating network (IPN) structure in at least a portion thereof.

The method for melt blending the ionomer serving as component (a) with the polysilsesquioxane serving as component (b), while not subject to any particular limitation, is preferably carried out using, for example a vacuum-vented twin-screw extruder having arranged thereon a screw segment configuration with a kneading disc zone. In such a case, it is advantageous to use a twin-screw extruder having an L/D ratio for the overall screw of at least 25 and a kneading disc zone L/D ratio which is in a range of from 20 to 80% of the overall L/D ratio.

The temperature when melt-blending the above ionomer component (component (a)) and the polysilsesquioxane component (component (b)), i.e., the reaction temperature, is preferably in a range of about 100 to about 250° C., more preferably in a range of about 130 to about 240° C., and even more preferably in a range of about 150 to about 230° C. It should also be noted that alkali metal cations can be advantageously used because including alkali metal cations in the ionomer component (component (a)) enables the reaction to proceed more efficiently. The reason for including at least an alkali metal as the metal cationic species in the ionomer component (component (a)) is that alkali metal salts of the carboxylic acids in the ionomer promote an ester condensation reaction between alkoxy groups serving as terminal functional groups of the polysilsesquioxane and un-neutralized carboxylic acids of the ionomer.

The golf ball material of the invention can additionally include optional additives as appropriate for the intended use. When the inventive golf ball material is to be used as a cover material, various additives such as pigments, dispersants, antioxidants, ultraviolet absorbers and light stabilizers can be added to the ionomer blend composition of above components (a) and (b). When such additives are included, they can be added in an amount of generally at least 0.1 part by weight, and preferably at least 0.5 part by weight, but generally not more than 10 parts by weight, and preferably not more than 5 parts by weight, per 100 parts by weight of above components (a) and (b) combined.

The golf ball material of the invention has a specific gravity which, while not subject to any particular limitation, is preferably at least 0.9, more preferably at least 0.92, and even more preferably at least 0.94, but is preferably not more than 1.3, more preferably not more than 1.2, and even more preferably not more than 1.05.

Parts obtained using the golf ball material of the invention have a Shore D hardness of preferably at least 35, and more preferably at least 40, but preferably not more than 75, and more preferably not more than 70. If the Shore D hardness is too high, the golf ball that has been formed may have a significantly diminished feel on impact. On the other hand, if the Shore D hardness is too low, the coefficient of restitution of the golf ball may decrease.

The thermoplastic ionomer blend composition-containing golf ball material of the invention can be used as a cover material in a two-piece solid golf ball composed of a core and a cover encasing the core, or can be used as a cover material or intermediate layer material in a multi-piece solid golf ball composed of a core of at least one layer, at least one intermediate layer encasing the core, and a cover of at least one layer encasing the intermediate layer.

As explained above, the golf ball material of the invention is an ionomer-based golf ball material in which a polysilsesquioxane material is used both as an inorganic filler and also a resin modifier having functions to improve inorganic filler dispersibility, scuff resistance, mold releasability, and coefficient of restitution. Moreover, golf balls which include as an essential component a part made from such a golf ball material have an enhanced coefficient of restitution and an excellent scuff resistance.

EXAMPLES

Working examples of the invention and comparative examples are provided below by way of illustration and not by way of limitation. From the results of thermal gravimetric analysis (TGA) on the polymethylsilsesquioxane (PMSQ) used in the working examples, the silicon oxide content after removal of the organic component was taken to be 77 wt %; the amount of PMSQ included in the ionomer blend composition was calculated on this basis. The twin-screw extruder for acid-neutralizing reactions used in the working examples of the invention had a screw diameter of 32 mm, an overall L/D ratio of 41 and an L/D ratio of the kneading disc zone equivalent to 40% of the overall L/D ratio, and was equipped with a vacuum-venting port.

Working Example 1

A dry blend of PMSG (5.2 parts by weight of PMSQ equivalent to 4.0 parts by weight of the total amount of its reduced inorganic average molecular weight: 5000 to 7000), Polymer-1, Polymer-2 and Pigment formulated as shown in Table 1 was fed to the hopper of a twin-screw extruder set to 220° C. and extruded under vacuum venting, thereby giving the uniform ionomer blend composition "Ionomer 1." The screw speed was 125 rpm, and the extrusion rate was 5.0 kg/hr. The physical properties of the resulting Ionomer 1 material are shown in Table 1. During extrusion, an alcohol odor excluded from the vent-port was confirmed.

In a separate procedure, PMSQ and Polymer-2 were kneaded together in a Labo Plastomill (set to 220° C.), and ester bond formation (an increase in absorption near the —SiO—CO— ester bond stretching vibration wavelength $\nu_{Si-O-C}$ of about 1150 cm$^{-1}$) by a condensation reaction between ethoxy groups on the PMSQ and carboxylic acids in the polymer (Polymer-2) was confirmed by Fourier transform infrared spectroscopy (FTIR). The FTIR spectra are shown in FIGS. 1A-1C.

Measurement Conditions

Measurement was carried out with an FTIR spectrometer (FTIR-8100, manufactured by Shimadzu Corporation) by the attenuated total reflectance (ATR) method.

Top spectrum: Spectrum of reaction product of PMSQ and Polymer-2

(Compared with the background Polymer-2 spectrum; indicated by arrow in diagram. The absorption near the —Si—O—CO— ester bond stretching vibration wavelength $\nu_{Si-O-C}$ of about 1150 cm$^{-1}$ has increased.

Middle spectrum: Spectrum of PMSQ alone
Bottom spectrum: Spectrum of Polymer-2

Using the "Ionomer 1" material obtained as described above as the cover material in two-piece golf balls, and using crosslinked butadiene rubber cores (diameter, 39.3 mm; weight, 36.9 g; deflection, 3.25 mm), two-piece golf balls were manufactured by injection molding. Evaluations of the golf balls were carried out. The results are shown in Table 1 below. The molded golf balls had a good mold releasability.

The above butadiene rubber cores were prepared using the following formulation.

| | |
|---|---|
| cis-1,4-Polybutadiene rubber | 100 parts by weight |
| Zinc acrylate | 21 parts by weight |
| Zinc oxide | 5 parts by weight |
| Barium sulfate | 26 parts by weight |
| Dicumyl peroxide | 0.8 part by weight |

The golf balls obtained in Working Example 1 using the "Ionomer 1" material had an increased initial velocity and coefficient of restitution (COR) compared with Comparative Example 1 (titanium oxide-lacking ionomer) and Comparative Example 2 (titanium oxide-containing ionomer).

Measurements with a capillary viscometer (220° C.) were taken of Ionomer 1 obtained in above Working Example 1, Ionomer 4 obtained in Comparative Example 1, and Ionomer 5 obtained in Comparative Example 2. As a result, the "Ionomer 5" ($TiO_2$/Polymer-1/Polymer-2) material of Comparative Example 2 obtained by blending titanium oxide into the Ionomer 4 (Polymer-1/Polymer-2) base ionomer material of Comparative Example 1 had substantially the same flow properties (change in viscosity with respect to shear rate) as the "Ionomer 4" material, whereas the flow properties of the Ionomer 1 obtained in Working Example 1 showed a somewhat greater change in viscosity in the low-shear region, which was presumably due to the reaction of Ionomer 1 with the PMSQ. The results are shown in FIG. 2.

Working Example 2

In Working Example 2, aside from replacing titanium oxide for a portion of the PMSQ in Working Example 1, the same procedure as in Working Example 1 was carried out using the compounding proportions shown in Table 1 below (2.6 parts by weight of PMSQ and 2.0 parts by weight of titanium oxide; equivalent to 4.0 parts by weight of the total amount of their reduced inorganic materials), thereby giving the ionomer blend composition "Ionomer 2." In addition, two-piece golf balls were produced using this material as the cover material. The molded golf balls had a good mold releasability. Evaluations of the golf balls were carried out. The results are shown in Table 1 below.

As in Working Example 1, the golf balls made using the "Ionomer 2" material in Working Example 2 had an improved initial velocity and coefficient of restitution (COR) relative to Comparative Example 1 (titanium oxide-lacking ionomer) and Comparative Example 2 (titanium oxide-containing ionomer). Also, when the amount of PMSQ included relative to Working Example 1 was reduced and the inorganic material weight corresponding to the reduction was replaced with titanium oxide, Working Example 2 had about the same properties as those in Working Example 1. It was thus assumed that the dispersibility of the titanium oxide was improved by the PMSQ.

Working Example 3

In Working Example 3, aside from reducing the amount of titanium oxide in Working Example 2, the same procedure as in Working Example 1 was carried out using the compounding proportions shown in Table 1 below (2.6 parts by weight of PMSQ and 1.0 part by weight of titanium oxide equivalent to 3.0 parts by weight of the total amount of their reduced inorganic materials), thereby giving the ionomer blend composition "Ionomer 3." In addition, two-piece golf balls were produced using this material as the cover material. The molded golf balls had a good mold releasability. Evaluations of the golf balls were carried out. The results are shown in Table 1 below.

As in Working Examples 1 and 2, the golf balls made using the "Ionomer 3" material in Working Example 3 had an improved initial velocity and coefficient of restitution (COR) relative to Comparative Examples 1 and 2. Also, even when the equivalent total amount of the inorganic materials included was reduced, the balls exhibited good properties with no declines in the initial velocity, coefficient of restitution and durability, indicating that such a reduction posed not problem.

Comparative Example 1

In Comparative Example 1, to compare the physical properties of a base polymer containing no inorganic filler whatsoever (Polymer-1/Polymer-2) with the working examples, the ionomer blend composition "Ionomer 4" was obtained by carrying out, aside from the exclusion of PMSQ, the same procedure as in Working Example 1 using the compounding proportions shown in Table 1 below. Two-piece golf balls were then produced using this material to form the cover layer. The molded golf balls had a poor mold releasability.

Compared with the properties of the golf balls obtained in the working examples, the initial velocity, coefficient of resilience and durability tended to be inferior. The durability in particular was poor.

Comparative Example 2

For the sake of comparison with Working Examples 1 and 2, the ionomer blend composition "Ionomer 5" of Comparative Example 2 was prepared by carrying out the same procedure as in Working Example 1 using the compounding proportions shown in Table 1 below; that is, using the same equivalent total amount of the inorganic materials included as in Working Examples 1 and 2, but including also 4 parts by weight of titanium oxide. Two-piece golf balls were then produced using this material to form the cover layer. The molded golf balls had a poor mold releasability.

Compared with the properties of the golf balls obtained in the working examples, the golf balls obtained in Comparative Example 2 had a poor initial velocity and coefficient of resilience, thus demonstrating the good effects achieved by including PMSQ in the working examples.

TABLE 1

| | Working Example | | | Comparative Example | |
|---|---|---|---|---|---|
| | 1 | 2 | 3 | 1 | 2 |
| | | | Sample No. | | |
| | Ionomer 1 | Ionomer 2 | Ionomer 3 | Ionomer 4 | Ionomer 5 |
| PMSQ | 5.2 | 2.6 | 2.6 | — | — |
| Titanium oxide | — | 2.0 | 1.0 | — | 4.0 |
| Polymer-1 | 40 | 40 | 40 | 40 | 40 |
| Polymer-2 | 60 | 60 | 60 | 60 | 60 |
| Pigment | 0.05 | 0.05 | 0.05 | 0.05 | 0.05 |
| Melt flow rate (g/10 min, 190° C.) | 3.4 | 4.0 | 4.0 | 3.8 | 4.0 |
| Shore D | 61 | 62 | 61 | 62 | 62 |
| UTS (MPa) | 19.9 | 24.1 | 24.0 | 27.6 | 26.3 |
| UTE (%) | 319 | 347 | 342 | 325 | 368 |
| Golf ball diameter (mm) (42.65 to 42.75 mm) | 42.74 | 42.72 | 42.72 | 42.71 | 42.71 |
| Golf ball weight (g) (44.80 to 45.60 g) | 45.53 | 45.53 | 45.46 | 45.43 | 45.59 |
| Deflection (mm), at 23° C. | 2.82 | 2.82 | 2.82 | 2.73 | 2.72 |
| Initial velocity (m/s), at 23° C., USGA | 76.58 | 76.59 | 76.61 | 76.49 | 76.30 |
| Average COR | 0.774 | 0.774 | 0.774 | 0.770 | 0.769 |
| Durability (shot number) | 89 | 93 | 99 | 81 | 90 |
| Scuff resistance (on a scale of 1 (best) to 6 (poorest)) | 2 | 2 | 2 | 4 | 3 |

PMSQ

Polymethylsilsesquioxane, available from Konishi Chemical Industry Co., Ltd. Terminal functional group, ethoxy group; Mw, 3100.

TiO$_2$

Titanium oxide, available from Ishihara Sangyo Kaisha, Ltd. Average particle size, 0.21 μm.

Polymer-1

Zinc ionomer of ethylene-methacrylic acid copolymer, available from DuPont. MFR, 5.0 g/10 min.

Polymer-2

Sodium ionomer of ethylene-methacrylic acid copolymer, available from DuPont. MFR, 3.0 g/10 min.

Pigment

Pigment Blue 29, available from Toyo Ink Mfg. Co., Ltd.

The golf ball materials and methods of measuring golf ball properties are described below.

MFR (g/10 min)

The melt flow rate was measured in accordance with JIS-K7210 at a test temperature of 190° C. and a test load of 21.18 N (2.16 kgf).

Shore D Hardness

The Shore D hardness was measured in accordance with ASTM D-2240.

UTE (%), UTS (MPa)

The ultimate tensile elongation (UTE) and the ultimate tensile strength (UTS) were measured in accordance with JIS-K7161.

Deflection

The golf ball was placed on a steel plate, and the deflection (mm) by the ball when compressed under a final load of 1,275 N (130 kgf) from an initial load of 98 N (10 kgf) was measured. This test was carried out at 23±1° C.

Initial Velocity

The initial velocity was measured using an initial velocity measuring apparatus of the same type as the USGA drum rotation-type initial velocity instrument approved by the R&A. The ball was temperature-conditioned for at least 3 hours at 23±1° C., then tested at the same temperature by being hit with a 250 pound (113.4 kg) head (striking mass) at an impact velocity of 143.8 ft/s (43.83 m/s). Ten balls were each hit twice. The time taken for a ball to traverse a distance of 6.28 ft (1.91 m) was measured and used to compute the initial velocity of the ball. This cycle was carried out over a period of about 15 minutes.

Coefficient of Restitution (COR)

The ball was fired from an air cannon against a steel plate at a velocity of 43 m/s, and the rebound velocity was measured. The coefficient of restitution (COR) is the ratio of the rebound velocity to the initial velocity of the ball.

Shot Number (Durability)

The durability of the golf ball was evaluated using an ADC Ball COR Durability Tester manufactured by Automated Design Corporation (U.S.). A ball was fired using air pressure and made to repeatedly strike two steel plates arranged in parallel. The average number of shots required for the ball to crack was treated as its durability. These average values were obtained by furnishing four balls of the same type for testing, repeatedly firing each ball until it cracked, and averaging the number of shots required for the four balls to crack. The type of tester used was a horizontal COR durability tester, and the incident velocity of the balls on the steel plates was 43 m/s.

Scuff Resistance

The golf balls were held at a temperature of 23±1° C. and hit at a head speed of 33 m/s using a pitching wedge mounted on a swing robot machine, after which damage from the impact was visually rated according to the following scuff resistance scale.

| Best: | 1 point |
|---|---|
| Better: | 2 points |
| Good (ordinary): | 3 points |
| Poor: | 4 points |
| Poorer: | 5 points |
| Poorest: | 6 points |

The invention claimed is:

1. A golf ball material comprising an ionomer blend composition of:

(a) an ionomer having a base resin which is an E/X copolymer and/or an E/X/Y terpolymer, wherein E is an α-olefin, X is a $C_3$ to $C_8$ unsaturated monocarboxylic acid, unsaturated dicarboxylic acid or acid anhydride thereof and Y is an alkyl ester of an unsaturated monocarboxylic acid or unsaturated dicarboxylic acid in which the alkyl groups have from 1 to 8 carbon atoms, wherein X is present in an amount of from about 1 to about 30 wt % based on the total weight of said copolymer or said terpolymer, and Y is present in an amount of from about 2 to about 30 wt % based on the total weight of said terpolymer; and (b) one or more polysilsesquioxanes which has at least an alkoxy group as one terminal functional group, having one of chemical structures (ii) and (iii) below,

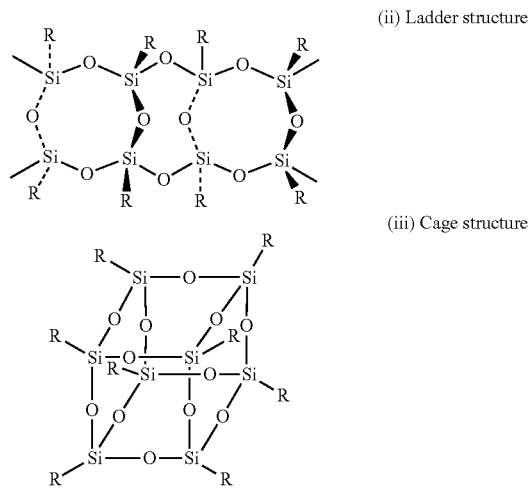

(ii) Ladder structure (iii) Cage structure wherein R is a functional group having from 1 to 10 carbons and is selected from the group consisting of alkyl, alkenyl, cycloalkyl, allyl, aralkyl, aryl, hydroxyl and alkoxy radicals, wherein the ionomer of component (a) includes metal cations from a metal cation source in the form of fine particles which have an average particle size of about 0.001 to about 5.0 μm and are made of an oxygen-containing inorganic metal compound selected from the group consisting of metal oxides, metal carbonates and metal hydroxides, or in the form of a masterbatch of said fine particles, and wherein at least some portion of the acid groups in the ionomer base resin is neutralized by said metal cation source, and wherein titanium oxide is added to the component (b).

2. The golf ball material of claim 1, wherein, in the chemical structure (ii) or (iii) of said polysilsesquioxane, at least one terminal functional group represented by R is an alkoxy radical selected from the group consisting of methoxy, ethoxy, n-propoxy, isopropoxy, n-butoxy, isobutoxy, sec-butoxy, tert-butoxy, cyclohexyloxy and benzyloxy radicals.

3. The golf ball material of claim 1, wherein said polysilsesquioxane has a weight-average molecular weight of at least about 500 but less than about 20,000.

4. The golf ball material of claim 1, wherein component (b) is included in a proportion, based on the combined weight of components (a) and (b), of from about 0.1 to about 30 wt %.

5. The golf ball material of claim 1, wherein components (a) and (b), when mixed together, are mixed at a temperature of from about 100 to about 250° C.

6. The golf ball material of claim 1, wherein the ionomer of component (a) includes metal cations from a metal cation source which is an oxygen-containing inorganic metal compound, said metal cations providing a degree of neutralization, based on the acid content of the ionomer base resin, of at least about 5 mol %.

7. The golf ball material of claim 1, wherein the metal cation source is selected from among groups IA, IB, IIA, IIB, IIIA, IIIB, IVA, IVB, VA, VB, VIA, VIB, VIIB and VIIIB of the periodic table.

8. The golf ball material of claim 1, wherein the ionomer of component (a) has a metal cationic species which includes at least a group IA alkali metal that promotes an ester condensation reaction between alkoxy groups on the polysilsesquioxane and carboxylic acids on the ionomer.

9. The golf ball material of claim 1, wherein the oxygen-containing inorganic metal compound is one or more selected from the group consisting of lithium carbonate, sodium carbonate, potassium carbonate, magnesium carbonate, zinc carbonate, basic zinc carbonate, calcium carbonate, magnesium oxide, zinc oxide, calcium oxide, calcium hydroxide and magnesium hydroxide.

10. The golf ball material of claim 1, wherein, in the copolymer and/or terpolymer of component (a), the olefin E is ethylene, the unsaturated monocarboxylic acid, unsaturated dicarboxylic acid or acid anhydride thereof X is selected from the group consisting of acrylic acid, methacrylic acid, maleic acid and maleic anhydride, and Y is an unsaturated monocarboxylic acid ester or unsaturated dicarboxylic acid half ester selected from the group consisting of n-butyl acrylate, isobutyl acrylate and maleic acid monoethyl ester.

11. The golf ball material of claim 1, wherein the ionomer blend composition having component (a) further comprises a thermoplastic resin component selected from the group consisting of ethylene ionomers, polyolefins, metallocene polyolefins, polystyrene elastomers, diene polymers, polyacrylate polymers, polyamide elastomers, polyurethane elastomers, polyester elastomers and polyacetals.

12. The golf ball material of claim 1, wherein the ionomer blend composition has in at least some portion thereof an interpenetrating network (IPN) structure.

13. A golf ball comprising the golf ball material of claim 1, wherein the golf ball material is used as a cover material in a solid two-piece golf ball comprising a core and a cover encasing the core or as a cover material or an intermediate layer material in a solid multi-piece golf ball comprising a core of at least one layer, at least one intermediate layer encasing the core, and a cover of at least one layer encasing the intermediate layer.

14. A method for preparing the golf ball material of claim 1, comprising the step of melt blending components (a) and (b) using a twin-screw extruder having an L/D ratio for the overall screw of at least 25 and a kneading disc zone L/D ratio which is in a range of from 20 to 80% of the overall L/D ratio so as to obtain an ionomer blend composition.

15. A method for preparing the golf ball material of claim 1, comprising the steps of melt blending (a) said ionomer having a base resin which is at least one E/X copolymer and/or E/X/Y terpolymer with (b) said polysilsesquioxane and titanium oxide; then carrying out a neutralization reaction with an oxygen-containing metal compound which is a metal cation source so as to obtain an ionomer blend composition of (a) and (b).

* * * * *